Figure 1:
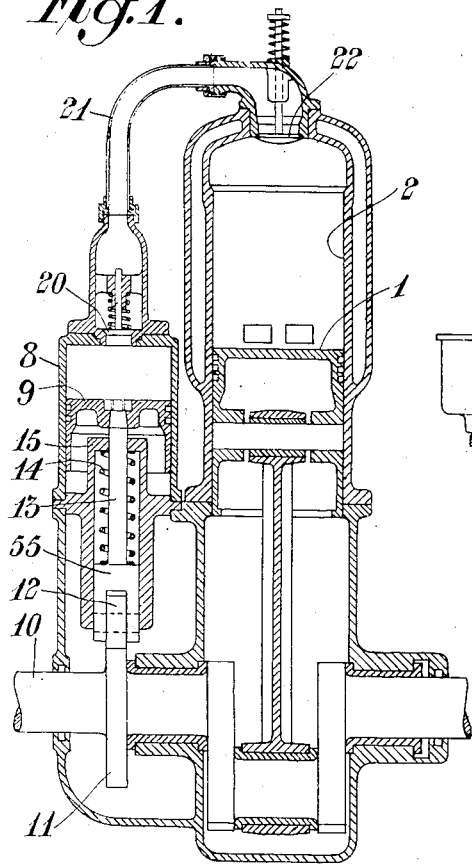

Jan. 18, 1927.

C. F. G. KJELLBERG 1,614,736

EXPLOSION ENGINE

Filed June 7, 1922

2 Sheets-Sheet 1

Inventor:

CARL FREDRIK GUNNAR KJELLBERG

By George Bayard Jones atty.

Jan. 18, 1927.   1,614,736
C. F. G. KJELLBERG
EXPLOSION ENGINE
Filed June 7, 1922   2 Sheets-Sheet 2
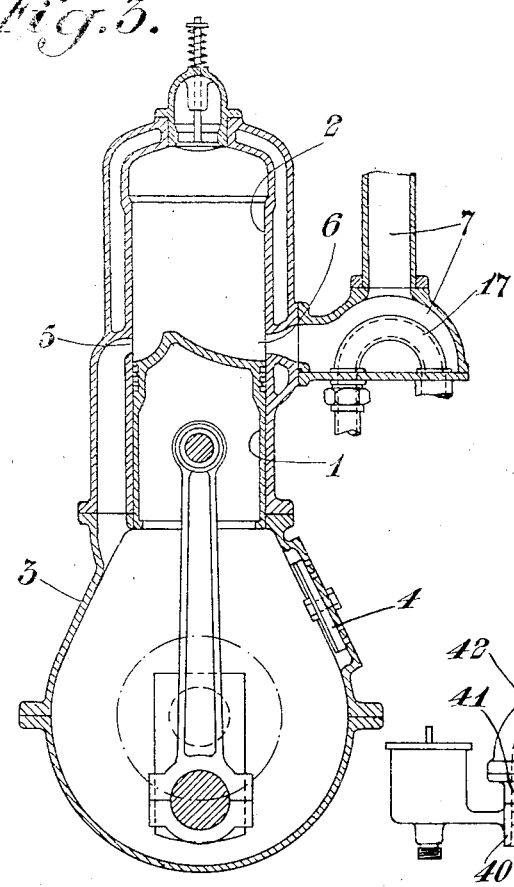
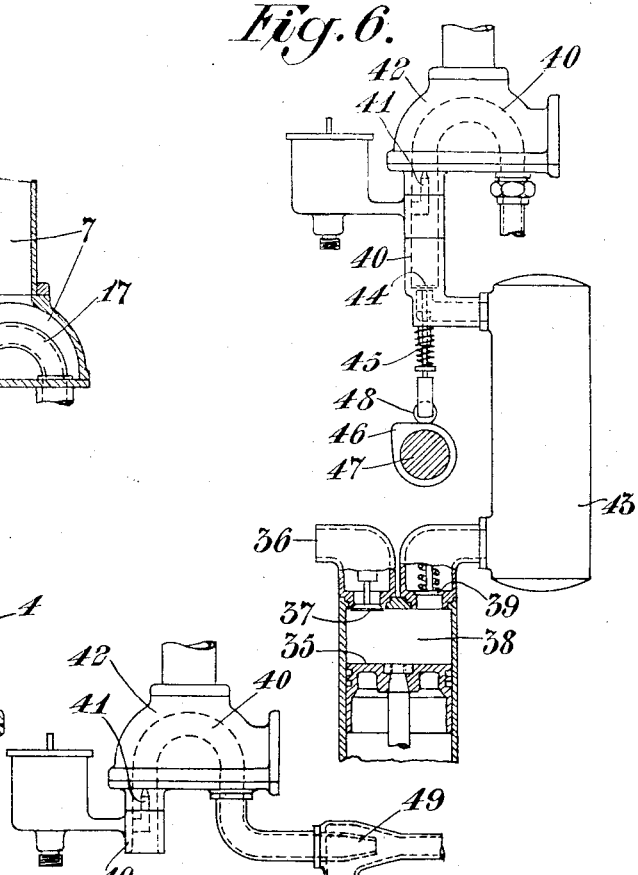
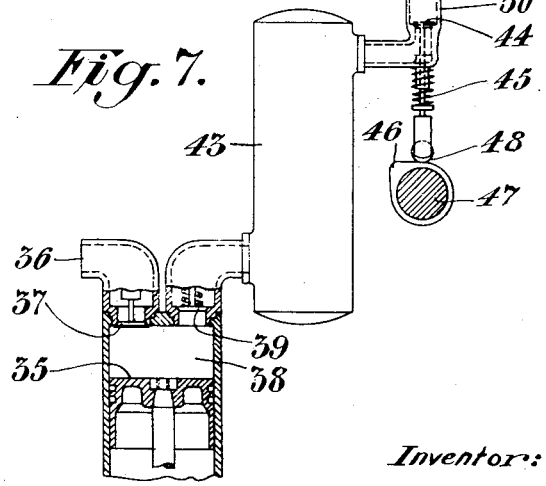
Inventor:
CARL FREDRIK GUNNAR KJELLBERG
By George Bayard Jones atty.

Patented Jan. 18, 1927.

1,614,736

UNITED STATES PATENT OFFICE.

CARL FREDRIK GUNNAR KJELLBERG, OF STOCKHOLM, SWEDEN.

EXPLOSION ENGINE.

Application filed June 7, 1922, Serial No. 566,543, and in Sweden June 6, 1921.

The present invention relates to explosion engines, particularly two stroke cycle engines, and has for its purpose to feed gasified or gaseous fuel as well as air into such engines in exact proportions for ignition in the explosion chamber. A further purpose of the invention is to precisely control the filling of the cylinders of the engine and thus also the explosion pressure, so that the engine will operate economically and uniformly.

In a two stroke cycle engine the cylinder is usually provided with open ports, namely, an exhaust port for the gases of combustion, and an inlet port for admission of air by means of which the gases of combustion are forced out of the cylinder, so that the cylinder becomes filled with air to be mixed with the fuel so as to form an explosive mixture. Said ports are usually placed at the lower end of the cylinder, the piston serving as a regulating slide valve for opening and closing said ports. The gases of combustion are exhausted through the exhaust port when said port is opened by the piston during its downward stroke. The crank casing of the engine is usually utilized as an air compressor for the air to be forced into the cylinder for scavenging the same. When during the last portion of its downward stroke the piston lays bare the air admission port, the compressed air is pressed from the crank casing into the cylinder and drives out the gases of combustion. The air admission port and the exhaust port for the gases of combustion being open simultaneously a portion of the admitted air escapes through the exhaust port. Hence the cylinder of a two stroke cycle engine as now constructed becomes incompletely filled owing to which fact the efficiency of the engine becomes poor and the consumption of fuel high.

This disadvantage is avoided according to the present invention by the engine being provided with means, such as a pump, operated by the engine for introducing an additional charge of air into the cylinder during the compression stroke after said ports in the cylinder have been closed by the piston. The pump thus supplies to the engine cylinder a quantity of air corresponding to that which escapes from the cylinder through the exhaust port before said port becomes closed by the piston during its upwards stroke.

In certain two stroke cycle engines liquid fuel is introduced into the cylinder by means of a piston pump. Such pumps, however, are difficult to maintain perfectly tight and thus cause leakage and waste of fuel. Furthermore, in order to gasify liquid fuel and intimately mix it with air a high compression pressure is required, but a higher compression pressure than that necessary for the explosion decreases the efficiency of the engine. In other types of two stroke cycle engines the fuel is introduced together with the scavenging air, which results in a portion of the fuel escaping together with the air through the exhaust port. These disadvantages are avoided according to the present invention by the fuel being introduced into the engine cylinder in gaseous or gasified state during the compression stroke when the ports above referred to are closed by the piston. The fuel may be introduced by means of the pump which injects the additional charge of air, or by means of a separate pump.

According to one embodiment of the present invention the charging of air and fuel into the explosion chamber of the cylinder is thus effected by means of two separate pumps in such manner that the air is introduced by means of one pump and gaseous fuel by means of another pump.

According to another embodiment only one pump effects the charging of air and fuel, said pump being connected with a carburetter, mixing chamber, or the like from which during its stroke in one direction it sucks gaseous or gasified fuel together with a suitable quantity of air, after which it delivers such gas mixture during its next stroke into the explosion chamber of the cylinder.

According to a further embodiment the pump sucks in air during one stroke and during the next stroke it forces the air through a carburetter, mixing device, or the like, so that the air carries with it and becomes mixed with fuel vapour, such mixture being then forced into the explosion chamber of the cylinder.

A still further embodiment of the invention is that the pump is connected with a tank or the like into which it forces air up to a certain pressure. The tank is connected with the cylinder of the engine and is provided with a valve adapted to be opened, for instance, by means of a cam driven by the engine, so that when said valve is opened, the air is forced by the pressure in the tank into the explosion chamber of the engine cylinder, the air carrying with it into the cylinder fuel from a carburetor, mixing chamber, or the like.

Regulation of the fuel and air supply to the engine is preferably effected in well known manner by means of a throttle valve which is connected with the inlet of the pump.

The invention is adapted to be applied to single cylinder engines as well as to multi-cylinder engines, and it may also be applied to four stroke cycle engines.

Figure 2:
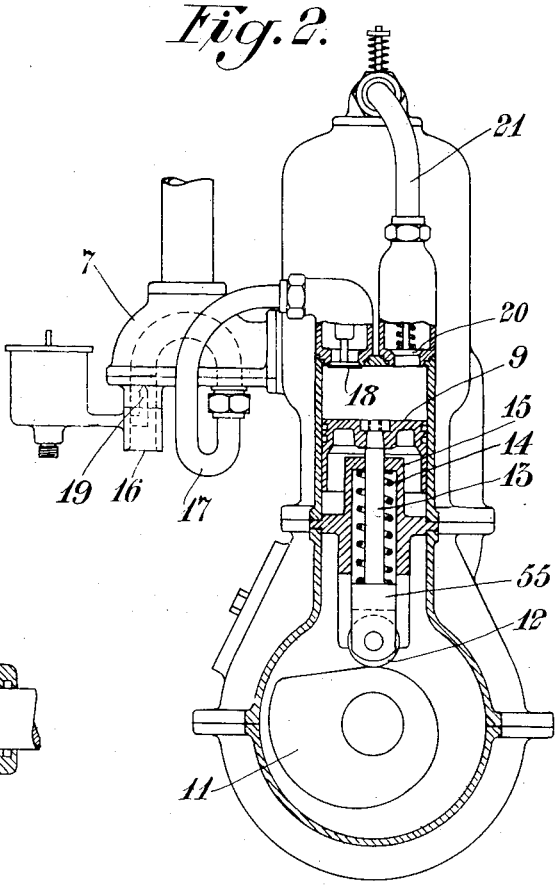
Figure 4:
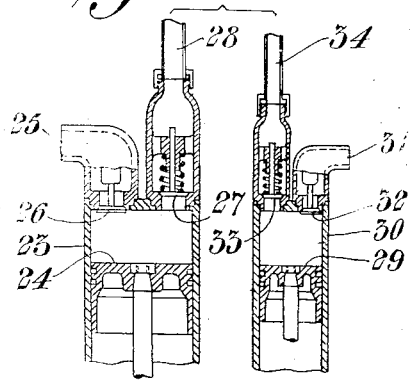
Figure 5:
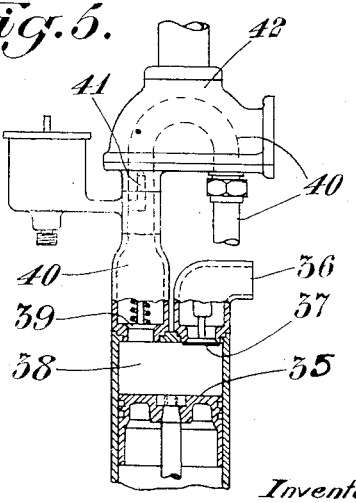

The accompanying drawings illustrate a few embodiments of the invention. Fig. 1 shows a vertical axial section of a two stroke cycle engine provided with a pump according to the invention, and Fig. 2 shows an end view of the engine with the pump partly in section. Fig. 3 shows the engine in vertical cross section through the engine cylinder. Fig. 4 shows diagrammatically a second embodiment adapted for an engine using gaseous fuel. Fig. 5 shows in similar manner a third embodiment, Fig. 6 a fourth embodiment, and Fig. 7 a fifth embodiment.

Figs. 1, 2 and 3 show a two stroke cycle engine of the well known type in which the working piston 1 during its upward stroke in the cylinder 2 sucks air into the crank casing 3 through the valve 4. During the subsequent downward stroke of the working piston 1 said piston compresses the air in the crank casing 3, until the piston 1 arrives towards the end of said stroke and opens the outlet port 6 and the inlet port 5 of the cylinder, when the air compressed in the crank casing will flow into the cylinder 2 through the port 5 and expel the gases of combustion from said cylinder through the outlet port 6 into the exhaust 7. Simultaneously a portion of the air forced in through the inlet port 5 will, of course escape through the outlet port 6, until during the upward stroke of the piston 1 said piston closes the ports 5 and 6 and confines the air in the cylinder. During the remaining portion of the upward stroke of the piston the air becomes compressed in the cylinder, and simultaneously, the required quantity of air and fuel is to be introduced into the cylinder.

According to the present invention the fuel is introduced by means of a pump comprising a cylinder 8 and a pump piston 9, which is driven from the shaft 10 of the engine in the construction illustrated by means of a cam 11 on said shaft which cam actuates a roller 12 rotatably mounted in the head 55 at the lower end of the pump piston rod 13. The pump piston 9 is actuated in the opposite direction by a spring 14 which is inserted between the head 55 of the rod 13 and a stationary support 15 of the pump. During the downward stroke of the pump piston 9 actuated by the spring 14 air is sucked into the pump cylinder 8 through the air intake 16 and the pipe 17 and past the valve 18. The air flows past the fuel nozzle 19 and carries with it fuel from said nozzle, which fuel becomes gasified in the pipe 17, which passes through the exhaust 7 and is thus heated by the exhaust gases. During the upward stroke of the pump piston 9 actuated by the cam 11 the piston forces the mixture of fuel and air through the pressure valve 20 and the pipe 21 and past the valve 22 into the cylinder 2. The cam 11 is so adjusted on the engine shaft 10 that the pump piston 9 performs its upward stroke and forces the mixture of fuel and air into the engine cylinder, when the working piston 1 has closed the ports 5 and 6 in the manner above described. The quantity of combustible mixture introduced by the pump corresponds to that quantity of air which escapes from the cylinder during the beginning of the upward stroke of the working piston 1 until said ports 5 and 6 have been closed.

According to the embodiment diagrammatically illustrated in Fig 4, which is adapted for an engine using gaseous fuel, the engine is provided with two pumps which may be arranged and operated by the engine in similar manner to that above described with reference to Figs. 1, 2 and 3. In the pump 23 the piston 24 during its suction stroke draws air through the air intake 25 past the valve 26, and during the upward stroke of the piston 24 the air in the pump cylinder is forced past the valve 27 and through the pipe 28 to the engine cylinder. Simultaneously with the suction stroke of the piston 24 the piston 29 of the pump 30 draws gas through the gas intake 31 past the valve 32, and forces the said gas during its subsequent upward stroke past the valve 33 and through the pipe 34 into the engine cylinder in the manner above described.

According to the embodiment diagrammatically illustrated in Fig. 5 and adapted for kerosene carbureters, the piston 35 which is operated by the engine in similar manner to that above described with reference to Figs. 1, 2 and 3, during its suction or downward stroke draws air through the air intake 36 past the valve 37 into the pump cylinder 38, and during its upward stroke said piston forces the air from said cylinder past the valve 39 into the pipe 40 and past the fuel nozzle 41 in said pipe. The pipe 40 passes through the exhaust 42 from the engine, which corresponds to the exhaust 7 in Figs. 2 and 3. The mixture of air and fuel will thus be heated in the pipe 40 so that the fuel becomes gasified, after which the mixture of fuel and air flows into the engine cylinder in the manner above described.

Figs. 6 and 7 both show modifications of the arrangement illustrated in Fig. 5. According to the construction shown in Fig. 6, the pump piston 35, which in this construction may be driven by the engine suitably by being connected to a crank on its shaft, discharges the air past the valve 39 into an air chamber 43, from which the pipe 40 leads through the exhaust 42 to the engine cylinder. In said pipe 40 there is provided, according to this embodiment, a valve 44 which is normally closed by a spring 45, but which, during the compression stroke of the engine—piston after the air inlet port and the exhaust port in the engine cylinder have been closed by said piston, is opened by a cam 46 on a shaft 47 driven by the engine, which cam actuates a roller 48 mounted in the stem of the valve 44.

The construction shown in Fig. 7 differs from that described with reference to Figs. 5 and 6 by that the air intake pipe 40, into which the fuel nozzle 41 projects, and which passes through the engine exhaust 42, ends with an injector nozzle 49 into a pipe 50, which connects the air chamber 43 with the engine cylinder, and in which pipe 50 the valve 44 actuated by the spring 45 and the cam 46 on a shaft 47 driven by the engine, is provided. When said valve 44 is opened by said cam 46 the air flowing from the chamber 43 through the pipe 50 to the engine cylinder, will draw air through the intake pipe 40, said air carrying with it fuel from the fuel nozzle 41 which becomes heated in said pipe 40, in the manner above described.

It is to be understood that the invention is not limited to the embodiments above described and illustrated in the drawing, as various modifications and changes may be made within the scope of the invention.

I claim:

1. An internal combustion motor provided with outlet openings in the working cylinder, said openings being adapted to be closed in the beginning of the compression stroke, a pump for introducing additional charges to said cylinder, and means for driving said pump for introducing the additional charges into said cylinder during the compression stroke thereof, said means comprising a member driven from the motor shaft and acting irregularly with respect to the crank motion, said member being so arranged that the actuation of said pump thereby for the introduction of the charge commences after the outlet openings of the working cylinder have been closed, and terminates when the volume of the charge of the pump has been pressed into the working cylinder, whereby the whole charge is caused to serve as an explosive gas mixture.

2. An internal combustion motor provided with outlet openings in the working cylinder thereof, said openings being adapted to be closed at the beginning of the compression stroke, an additional charge delivery pump, a receptacle for receiving the charge compressed during the first portion of the compression stroke of said pump, means for driving said pump from the motor shaft, a valve between said receptacle and working cylinder, and a member driven by said motor shaft for opening said valve after the outlet opening of said working cylinder has been closed, whereby said cylinder is placed in communication with said receptacle and said pump, said member permitting said valve to close after the compression stroke of said pump has been completed.

CARL FREDRIK GUNNAR KJELLBERG.